(12) United States Patent
Huang

(10) Patent No.: US 9,437,895 B2
(45) Date of Patent: Sep. 6, 2016

(54) H₂—CL₂ PROTON EXCHANGE MEMBRANE FUEL CELLS, FUEL CELL ASSEMBLIES INCLUDING THE SAME AND SYSTEMS FOR COGENERATION OF ELECTRICITY AND HCL

(71) Applicant: Southwest Research Institute, San Antonio, TX (US)

(72) Inventor: Francis Y. Huang, San Antonio, TX (US)

(73) Assignee: SOUTHWEST RESEARCH INSTITUTE, San Antonio, TX (US)

( * ) Notice: Subject to any disclaimer, the term of this patent is extended or adjusted under 35 U.S.C. 154(b) by 98 days.

(21) Appl. No.: 14/584,404

(22) Filed: Dec. 29, 2014

(65) Prior Publication Data
US 2016/0190630 A1 Jun. 30, 2016

(51) Int. Cl.
*H01M 8/22* (2006.01)
*H01M 8/08* (2016.01)
*H01M 8/10* (2016.01)

(52) U.S. Cl.
CPC .............. *H01M 8/22* (2013.01); *H01M 8/08* (2013.01); *H01M 8/1039* (2013.01); *H01M 8/1067* (2013.01); *H01M 2008/1095* (2013.01)

(58) Field of Classification Search
CPC ...... H01M 8/22; H01M 8/08; H01M 8/1023; H01M 8/1048; H01M 8/1039; H01M 8/1067
See application file for complete search history.

(56) References Cited

U.S. PATENT DOCUMENTS

| | | | |
|---|---|---|---|
| 3,236,691 A | 2/1966 | Reger et al. | |
| 3,881,958 A | 5/1975 | Carr et al. | |
| 4,059,495 A | 11/1977 | de Nora et al. | |
| 4,128,701 A | 12/1978 | Maricle | |
| 4,263,111 A | 4/1981 | Hooper et al. | |
| 4,647,351 A | 3/1987 | Gelb | |
| 5,041,197 A | 8/1991 | Gelb | |
| 6,218,038 B1 | 4/2001 | Oko et al. | |
| 6,902,839 B2 | 6/2005 | Park et al. | |
| 8,586,260 B2 * | 11/2013 | Gao | H01M 8/0291 429/452 |
| 2012/0219873 A1 | 8/2012 | Iyuke et al. | |
| 2013/0230794 A1 * | 9/2013 | Mondal | B01J 23/8913 429/526 |

OTHER PUBLICATIONS

Thomassen, M.S., "Hydrogen—Chlorine Fuel Cell for Production of Hydrochloric Acid and Electric Power"; thesis submitted for the degree of doktor ingenior, Trondheim, May 2005, Norwegian University of Science and Technology, NTNU, IMT—report 2005:70 (190 pgs).

Huskinson, B., et al, "A High Power Density, High Efficiency Hydrogen-Chlorine Regenerative Fuel Cell With A Low Precious Metal Content Catalyst"; available at <<http://arxiv.org/pdf/1206.2883.pdf>> Jun. 14, 2012 (13 pgs).

Middaugh, J., How to Make Cathodes With A Diffusion Layer For Single-Chamber Microbial Fuel Cells; http://www.engr.psu.edu/ce/enve/logan/bioenergy/pdf/Cathode_093008.pdf>> (7 pgs), Published online Jun. 5, 2006.

* cited by examiner

*Primary Examiner* — Stewart Fraser
(74) *Attorney, Agent, or Firm* — Grossman, Tucker et al

(57) ABSTRACT

Fuel cells and, more particularly, the H₂—Cl₂ proton exchange membrane fuels cells are described. In some embodiments the fuel cells include a flow through electrolyte assembly that is configured to allow the introduction of a first (relatively dilute) electrolyte into the cell, and the remove of a second (relatively concentrated) electrolyte from the cell. Fuel cell stacks and systems for cogenerating electricity and hydrochloric acid using such fuel cells are also described.

32 Claims, 6 Drawing Sheets

H₂—CL₂ PROTON EXCHANGE MEMBRANE FUEL CELLS, FUEL CELL ASSEMBLIES INCLUDING THE SAME AND SYSTEMS FOR COGENERATION OF ELECTRICITY AND HCL

FIELD

The present disclosure relates to fuel cells and, more particularly, the $H_2$—$Cl_2$ proton exchange membrane fuels cells. Fuel cell stacks and systems for cogenerating electricity and hydrochloric acid using such fuel cells are also described.

BACKGROUND

A substantial industry exists for the production of high purity sodium hydroxide (NaOH) and chlorine gas from the electrolysis of brine (sodium chloride solution). The production of NaOH via the electrolysis of brine is presented in equation I below:

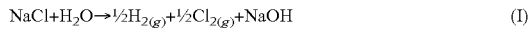

$$NaCl + H_2O \rightarrow \tfrac{1}{2}H_{2(g)} + \tfrac{1}{2}Cl_{2(g)} + NaOH \quad (I)$$

As shown, brine electrolysis also results in the production of hydrogen and chlorine gas as byproducts. Traditionally such byproducts have been disposed of by combustion to produce HCl and heat, neither of which appears to have much value in the production of NaOH. The combustion of these byproducts to produce HCl is outlined in equation (2) below, in which ΔG is the change in Gibbs free energy.

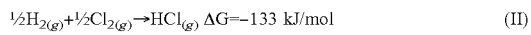

$$\tfrac{1}{2}H_{2(g)} + \tfrac{1}{2}Cl_{2(g)} \rightarrow HCl_{(g)} \quad \Delta G = -133 \text{ kJ/mol} \quad (II)$$

As can be seen from equation (II), the reaction proceeds spontaneously to form HCl. It is also exothermic and so may require significant cooling water to control temperature. Moreover, while combustion may facilitate disposal of the byproducts produced by brine electrolysis, it does little to offset the energy cost of the process. With this in mind, some research has aimed to develop fuel cells that utilize hydrogen gas as a fuel, chlorine gas as the oxidant (hereinafter, $H_2$—$Cl_2$ fuel cells), and hydrochloric acid as an electrolyte. Although such research has demonstrated that $H_2$—$Cl_2$ fuel cells show promise for generating electricity that may offset the energy cost of the brine electrolysis process, such fuel cells may suffer from various problems that may complicate or prevent their practical application in this and other industries.

BRIEF DESCRIPTION OF THE DRAWINGS

The accompanying drawings, which are incorporated in and constitute a part of this specification, illustrate several non-limiting embodiments of the present disclosure and, together with the description, serve to explain the principles of the present disclosure.

DETAILED DESCRIPTION

Figure 1:
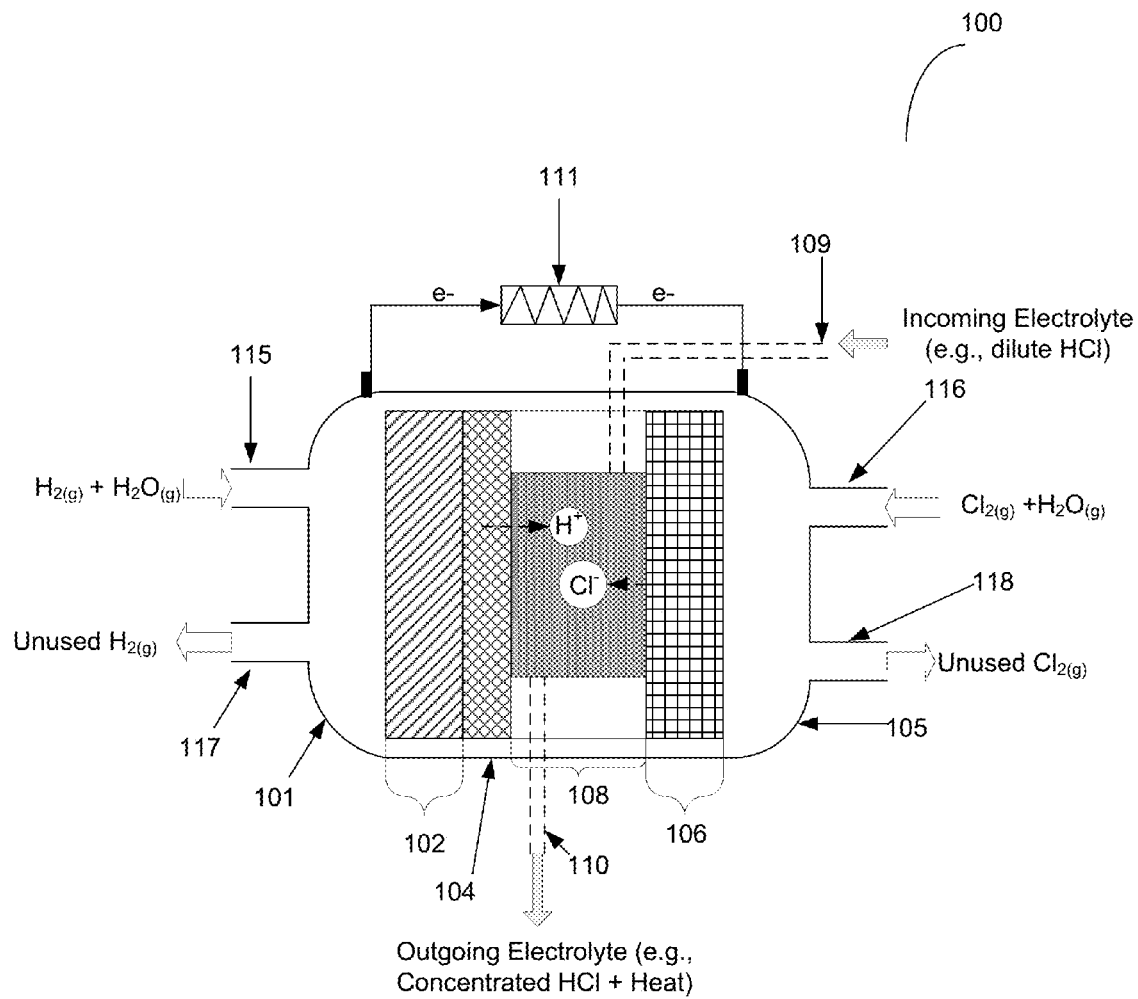
FIG. 1 is a cross sectional diagram of a one configuration of an $H_2$—$Cl_2$ Fuel Cell consistent with the present disclosure.

Reference will now be made in detail to exemplary embodiments of the present disclosure, examples of which are illustrated in the accompanying drawings. Wherever possible, the same reference numbers will be used throughout the drawings to refer to the same or like parts.

As discussed in the background, chemical processes such as the electrolysis of brine can produce hydrogen ($H_2$) and chlorine ($Cl_2$) gases, e.g., as byproducts of the production of another target product. Although such byproducts are often burned, some research has focused on the development of $H_2$—$Cl_2$ fuel cells that utilize $H_2$ and $Cl_2$ in a more beneficial manner. In particular, proton exchange membrane (PEM) fuel cells that utilize $H_2$ as a fuel and $Cl_2$ as an oxidant have been investigated.

Typically, $H_2$—$Cl_2$ PEM fuel cells include a proton exchange membrane that is present between an anode and a cathode. Gaseous $H_2$ and $Cl_2$ are introduced to opposite regions of the cell, whereupon the $H_2$ is oxidized to $H^+$ ions (also referred to herein as protons) at the anode and $Cl_2$ is reduced to $Cl^-$ ions at the cathode. The protons migrate through the anode and the proton exchange membrane and into the region adjacent the cathode. Likewise, the $Cl^-$ ions migrate into the region adjacent the cathode. The proton exchange membrane is configured to only allow the passage of cations. The proton exchange membrane thus prevents the $Cl^-$ ions from reaching the anode and potentially poisoning the catalyst. Moreover, the proton exchange membrane can effectively block the flow of electrons generated by the oxidation of $H_2$, and thus limit or prevent shorting of the cell. As the $H_2$—$Cl_2$ PEM fuel cell operates, the produced electrons may be directed to an external load as a source of power.

The main reactions in an $H_2$—$Cl_2$ fuel cell are presented in equations (III), (IV) and (V) below.

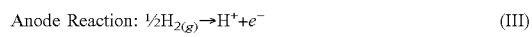

$$\text{Anode Reaction: } \tfrac{1}{2}H_{2(g)} \rightarrow H^+ + e^- \quad (III)$$

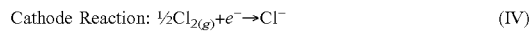

$$\text{Cathode Reaction: } \tfrac{1}{2}Cl_{2(g)} + e^- \rightarrow Cl^- \quad (IV)$$

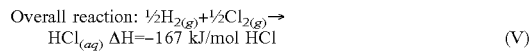

$$\text{Overall reaction: } \tfrac{1}{2}H_{2(g)} + \tfrac{1}{2}Cl_{2(g)} \rightarrow HCl_{(aq)} \quad \Delta H = -167 \text{ kJ/mol HCl} \quad (V)$$

where ΔH is the change in enthalpy.

Based on thermodynamics, the theoretical maximum voltage that can be produced from an $H_2$—$Cl_2$ fuel cell at 25° C. may be determined with equation (VI) below.

$$E = \Delta G / nF \quad (VI)$$

in which E is the cell voltage, ΔG is the change in Gibbs free energy in the fuel cell process, n is the number of moles of electrons per mole of HCl formed, and F is Faraday's constant, 96,487 coulombs (joules/volt). Applying equation (VI), when ΔG=133 kJ/mol (as defined in equation (II)) and n is 1 (correlating to 1 mole of electrons per mole of hydrogen), the theoretical maximum cell voltage (E) of an $H_2$—$Cl_2$ fuel cell equals 1.378 volts (at 25° C.).

Therefore if an $H_2$—$Cl_2$ fuel cell is efficient (i.e., experience no internal voltage loss), the maximum output of the cell can be as high as 1.378 volts at 25° C. Many prior known $H_2$—$Cl_2$ PEM fuel cells are not 100% efficient however, as reflected by the fact that they generally produce a voltage output that is significantly less than 1.378 volts.

One source of efficiency loss in an $H_2$—$Cl_2$ PEM fuel cell is believed to be attributable to the operating temperature of the cell. As can be seen from equation (V), the gas phase reaction of $H_2$ and $Cl_2$ to produce HCl is highly exothermic. Temperatures in an $H_2$—$Cl_2$ PEM fuel cell can therefore rapidly exceed 25° C. without cooling. As operating temperature of the cell increases its efficiency may be adversely affected, causing a reduction in the voltage output of the cell to below the theoretical maximum of 1.378 volts.

Another source of efficiency loss in an $H_2$—$Cl_2$ PEM fuel cell is believes to be attributable to the efficiency of the dissociation of $Cl_2$ in the cathode and the dissociation of $H_2$ in the anode. As the concentrations of $H^+$ and $Cl^-$ ions in the electrolyte decrease during operation of the cell, the current flow through the electrolyte is reduced which can negatively impact the current density and/or voltage output of the cell. This too may cause the output of the cell to decrease below the theoretical maximum of 1.378 volts.

Yet another source of efficiency loss in an $H_2$—$Cl_2$ PEM fuel cell is believed to be attributable to inadequate or excessive hydration of the proton exchange membrane. Inadequate or excessive hydration of the proton exchange membrane may be due to various factors, such as insufficient moisture in the $H_2$ gas, poor contact between the anode and the proton exchange membrane, inadequate or excessive passage of moisture through the anode, or some combination thereof. Inadequate hydration of the proton exchange membrane may prevent efficient transport of protons through the membrane, potentially reducing the voltage output of the cell. Likewise, excessive hydration (flooding) may negatively impact performance of the proton exchange membrane and/or other components of the cell, potentially limiting the voltage out of the cell.

With the foregoing in mind, one aspect of the present disclosure relates to novel $H_2$—$Cl_2$ PEM fuel cells. As will be discussed in detail below, the $H_2$—$Cl_2$ PEM fuels cells described herein may include features that may address one or more of the above noted issues. For example in some embodiments the $H_2$—$Cl_2$ PEM fuel cells described herein may include features such as a novel flow through electrolyte assembly. The flow through electrolyte assemblies described herein may facilitate the removal of relatively hot electrolyte from the cell, thus enabling better regulation of the cell operating temperature. They may also open avenues to recirculation and/or recycling of at least a portion of the HCl electrolyte back to the cell, which may limit or prevent the occurrence of over-potentials while at the same time reducing the need to add "new" electrolyte to the cell to maintain a continuous electric circuitry.

As will also be explained in detail below, in some embodiments the $H_2$—$Cl_2$ PEM fuel cells may also include features that facilitate suitable hydration of a proton exchange membrane in the cell. In particular the $H_2$—$Cl_2$ PEM fuel cells described herein may include an anode assembly that is configured to retain sufficient, but not excessive moisture in the anode assembly to hydrate the proton exchange membrane. The anode assembly may also be configured to enable good contact between the anode assembly and the proton exchange membrane, which may facilitate proper hydration of the proton exchange membrane.

Reference is now made to FIG. 1, which depicts one configuration of an $H_2$—$Cl_2$ proton exchange membrane fuel cell consistent with the present disclosure. As shown, fuel cell 100 includes anode gas manifold 101, anode assembly 102, proton exchange membrane 104, cathode gas manifold 105, cathode assembly 106, and flow through electrolyte assembly 108.

Anode gas manifold 101 may be any suitable manifold or other structure for supplying hydrogen gas to fuel cell 100. In this regard, anode gas manifold 101 may include one or more inlet ports or channels for the introduction of $H_2$ gas. This concept is illustrated in FIG. 1, which depicts anode gas manifold 101 as including a single gas inlet 115. In addition, anode gas manifold 101 may optionally include one or more outlets 117, e.g. for exhausting or recapturing unused inlet gas, e.g., for use as feed gases for another fuel cell. It should be understood that such illustration is for the sake of illustration only, and that first gas manifold 101 may be configured to deliver $H_2$ gas (and optionally exhaust unreacted $H_2$ gas) in any suitable manner. By way of example, anode gas manifold 101 may include one or more gas flow fields, such as one or more serpentine gas flow fields. Of course, serpentine gas flow fields are mentioned for the sake of example only, and anode gas manifold 101 may include a gas flow field of any suitable configuration.

Without limitation, anode gas manifold 101 is preferably in the form of a conductive plate, such as a fuel cell grade isotropic graphite plate. In such instances inlet 115 and outlet 117 may be integrally formed with a conductive plate forming anode gas manifold 101, or may be separate components that are coupled to the conductive plate in any suitable manner. In some embodiments, inlet 115 and outlet 117 may be separate ports that are chemically inert to the gases and environment applied in fuel cell 100. By way of example, inlet 115 and outlet 117 may be formed from one or more fluoropolymers such as perfluoroalkoxy alkane, polytetrafluoroethylene, etc. which may be chemically inert to the environment of fuel cell 100. In such embodiments, the conductive plate forming anode gas manifold 101 preferably includes one or more gas flow fields, such as one or more serpentine gas flow fields as described above.

Cathode gas manifold 105 may be any suitable manifold or other structure for supplying chlorine gas to fuel cell 100. Similar to anode gas manifold 101, cathode gas manifold may include one or more inlets or channels for the introduction of chlorine gas. This concept is illustrated in FIG. 1, which depicts cathode gas manifold 105 as including a single $Cl_2$ gas inlet 116. Like anode gas manifold 101, cathode gas manifold 105 may also optionally include one more outlets 118. As shown in FIG. 1, outlet 118 may function as a port for exhausting or recapturing unused $Cl_2$ gas, e.g., for use as feed gases for one or more additional fuel cells. Again, it should be understood that such illustration is for the sake of illustration only, and that cathode gas manifold 105 may be configured to deliver $Cl_2$ gas in any suitable manner. Indeed, like anode gas manifold 101, cathode gas manifold 105 may include one or more gas flow fields such as one or more serpentine gas flow fields.

Without limitation cathode gas manifold 105 is preferably configured in the same or substantially the same manner as anode gas manifold 101. Additional details with respect to this specific embodiment of cathode gas manifold 105 are therefore not reiterated, as they are the same as discussed above for anode gas manifold 101. Without limitation, cathode gas manifold 105 is preferably in the form of a conductive plate, such as a fuel cell grade isotropic graphite plate that includes at least one integral or separately formed inlet and/or outlet, as well as one or more gas flow fields such as those mentioned above with respect to anode gas manifold 101.

In some embodiments such as when anode and cathode gas manifolds 101, 105 both include conductive (e.g., graphite) plates, it may be understood that anode and cathode gas manifolds 101, 105 may also be respectively used as anode and cathode current collectors. This concept is better illustrated in FIG. 2, in which anode gas manifold 101 and cathode gas manifold 105 are depicted as a substantially flat conductive (e.g., graphite) plates that may abut and electrically couple with anode assembly 102 and cathode assembly 106, respectively. In particular, in some embodiments anode gas manifold may abut and electrically couple with a gas diffusion layer of anode assembly 102 (e.g., gas diffusion layer 302 of FIG. 3), and cathode gas manifold 105 may abut and electrically couple with a gas diffusion layer of cathode assembly 106 (e.g., gas diffusion layer 402 of FIG. 4). In any case, electrical contacts may be applied to anode and cathode gas manifolds 101, 105, so as to electrically couple such elements to external load 111. Configuring anode and cathode gas manifolds 101, 105 in this manner may also facilitate coupling of multiple fuel cells 100 into a fuel cell stack, as will be described later.

Figure 2:
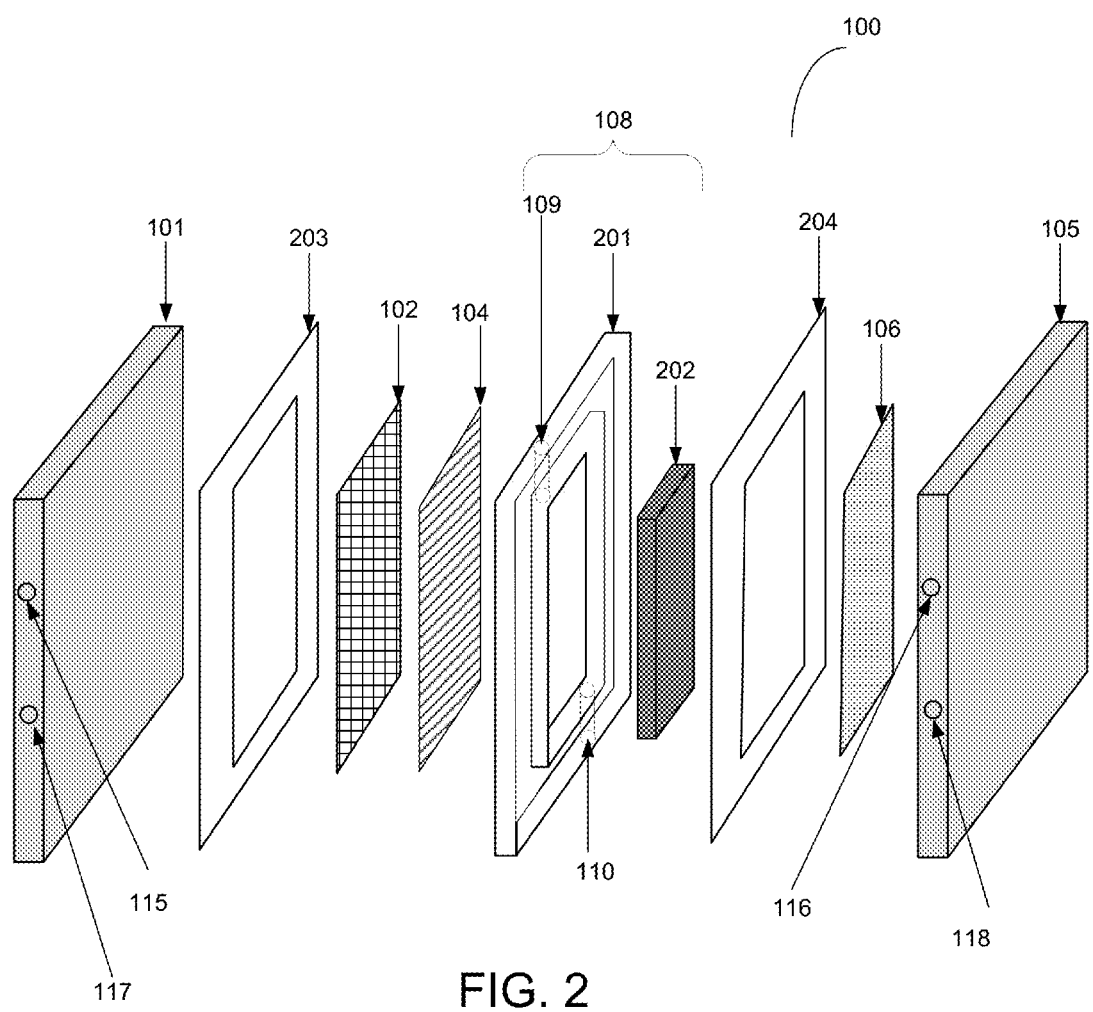
FIG. 2 is an exploded view of the $H_2$—$Cl_2$ fuel cell of FIG. 1.

In the embodiments of FIGS. 1 and 2, anode and cathode gas manifolds 101, 105 are directly coupled to anode assembly 102 and cathode assembly 106, respectively. In some embodiments, a gasket, such as a silicone or polytetrafluoroethylene gasket may be present between anode gas manifold 101 and anode assembly 102, and between cathode gas manifold 105 and cathode assembly 106. This concept is illustrated in FIG. 2, in which gasket 203 is present between anode gas manifold 101 and anode assembly, and gasket 204 is present between cathode gas manifold 105 and cathode assembly 106. In such embodiments gaskets 203, 204 may function to prevent leakage of gas and electrolyte from fuel cell 100.

Without limitation, anode and cathode gas manifolds 101, 105 are preferably configured to respectively supply $H_2$ and $Cl_2$ gas at relatively low pressure. In some embodiments for example, anode gas manifold 101 may be configured to supply $H_2$ gas at a pressure ranging from about 5 pounds per square inch gauge (psig) to about 20 psig. In the same or other embodiments, cathode gas manifold 105 may be configured to supply $Cl_2$ gas at a pressure ranging from about 5 psig to about 20 psig. In some embodiments the low pressure of the supplied gases may prevent pinhole formation in the electrodes, as well as to allow the gases to diffuse through the electrodes for dissociation and eventually reach equilibrium.

The $H_2$ gas supplied through inlet 115 may originate from any suitable source. In some embodiments, the source of the $H_2$ gas may be a chemical process, which as noted above may produce $H_2$ gas as a byproduct. In such instances inlet 115 may be coupled or otherwise configured to receive $H_2$ gas from a byproduct stream of a chemical process, such as a brine electrolysis, water electrolysis, or biomass gasification processes. Without limitation, the $H_2$ gas is preferably hydrated prior to being introduced into inlet 115. Hydration of the $H_2$ gas may be performed by passing the gas through a water bubbler prior to its entry into inlet 115. Without limitation, the water content of the $H_2$ gas preferably ranges from above 0.05% to about 1%. Once introduced into fuel cell 100, the $H_2$ gas may flow and come into contact with anode assembly 102. In general, anode assembly 102 may be in the form of a gas diffusion electrode that is configured to diffuse and oxidize the $H_2$ gas to $H^+$ ions (protons). In this regard, anode assembly 102 may include an anode catalyst that has catalytic activity with respect to hydrogen. As will be described later in connection with FIG. 3, in some embodiments the anode catalyst is in the form of a supported platinum containing catalyst, but other anode catalysts may be used. Moreover in some embodiments anode assembly 102 may include a multilayer structure including a gas diffusion layer, conductive support, and anode catalyst, as will also be further described in connection with FIG. 3.

The $Cl_2$ gas supplied through inlet 116 may originate from any suitable source. In some embodiments, the source of the $Cl_2$ gas may be a chemical process. In such instances inlet 116 may be coupled or otherwise configured to receive $Cl_2$ gas from a (purified or raw) byproduct stream of a chemical process, such as a brine electrolysis process, oxidation of hydrogen chloride, or manganese oxidation of brine.

Once introduced into fuel cell 100, the $Cl_2$ gas may flow and come into contact with cathode assembly 106. In general, cathode assembly 106 may be in the form of a gas diffusion electrode that is configured to diffuse and dissociate the $Cl_2$ gas to $Cl^-$ ions. In this regard, anode assembly 102 may include a cathode catalyst that has catalytic activity with respect to hydrogen. As will be described later in connection with FIG. 4, the cathode catalyst in some embodiments is in the form of a ruthenium containing catalyst such as ruthenium oxide ($RuO_2$), but other cathode catalysts may be used. Furthermore in some embodiments cathode assembly 106 may include a multilayer structure, as will also be further described in connection with FIG. 4.

Proton exchange membrane 104 (which may also be understood as a polymer electrolyte membrane) is a semipermeable membrane that may generally function to permit the passage of $H^+$ ions there through, while limiting or preventing the passage of $H_2$ and water soluble gases such as $CO_2$ and/or $O_2$. That is, proton exchange membrane 104 may generally function to separate the reactants of fuel cell 100, and to transport $H^+$ ions only to flow through electrolyte assembly 108. As may be appreciated, hydration of the proton exchange membrane can have a significant impact on the exchange rate of $H^+$. It may therefore be desirable to fully hydrate the proton exchange membrane so as to facilitate the exchange of $H^+$ ions. Furthermore the thickness of the proton exchange membrane may have an impact on its characteristics. In this regard, the thickness of the proton exchange membrane in some embodiments ranges from about 100 μm to about 300 μm.

With the above in mind, proton exchange membrane 104 may be any proton exchange membrane that is suitable for use in an $H_2$—$Cl_2$ PEM fuel cell. In some embodiments, proton exchange membrane 104 is a pure polymer membrane or a composite polymer membrane. In any case, proton exchange membrane 104 may include one or more ionomers that function to transport $H^+$ but which block the passage of anions such as $Cl^-$ and gases such as $H_2$ and $Cl_2$. An ionomer is understood as a polymer that includes electrically neutral repeating units and a fraction of ionized units. Non-limiting examples of suitable ionomers that may be used in the proton exchange membranes include ionic fluoropolymers such as ionic tetrafluroethylenes, e.g., sulfonated tetrafluroethylenes such as perfluorosulfonic acid/polytetrafluoroethylene copolymers. Of course these ionomers are named for the sake of example only, and other ionomers may be used as or in proton exchange membrane 104. Without limitation, proton exchange membrane 104 is preferably formed from an acidified perfluorosulfonic acid/polytetrafluoroethylene copolymer, such as those sold under the trade name NAFION® 112, 115, 117, and 212 by DUPONT® corporation.

Figure 5:
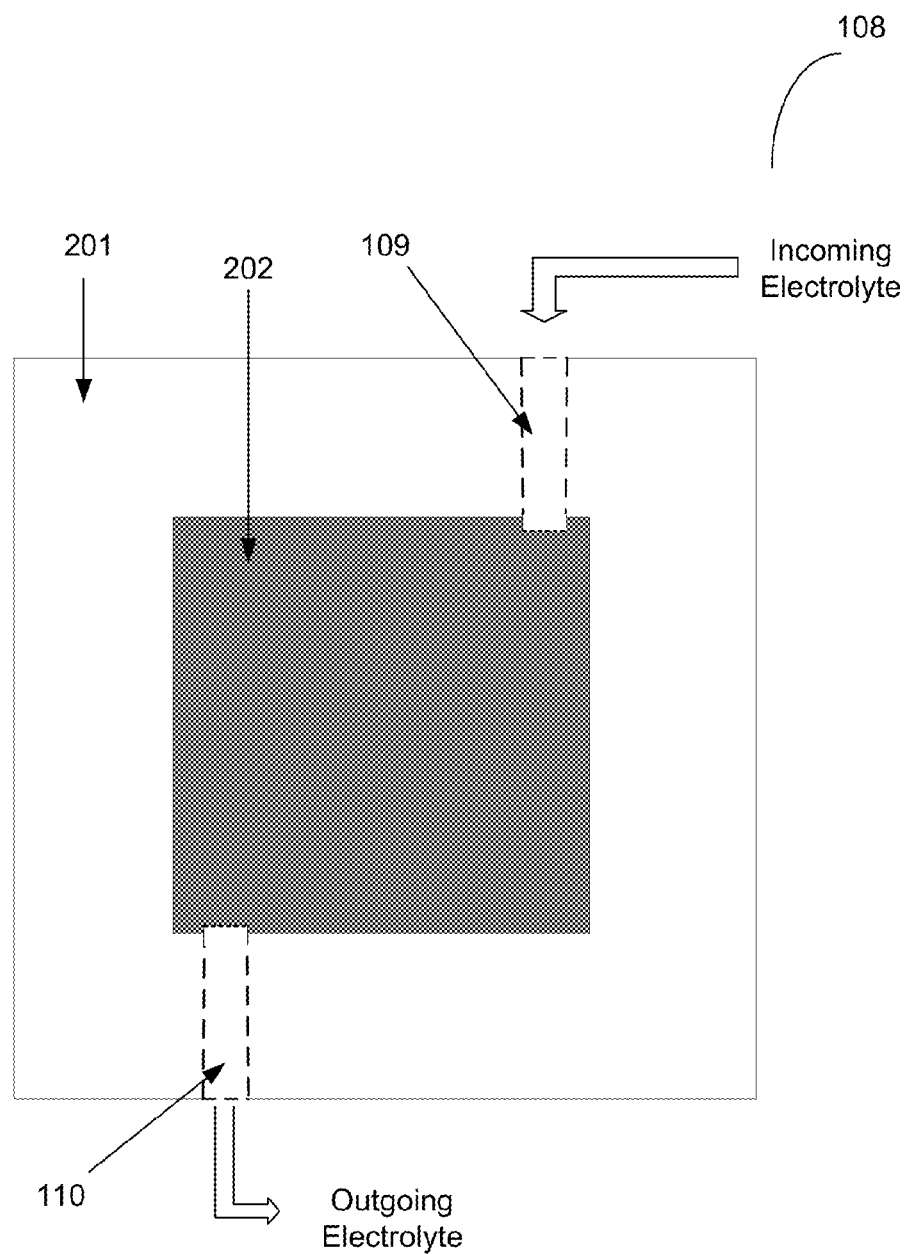
FIG. 5 is a face on view of one example of a flow through electrolyte assembly consistent with the present disclosure.

As further illustrated in FIG. 1, $H^+$ ions produced at anode assembly 102 may migrate through proton exchange membrane 104 and into flow through electrolyte assembly 108. Likewise, $Cl^-$ ions produced at cathode assembly 106 may migrate into flow through electrolyte assembly 108. As illustrated in FIGS. 2 and 5, flow through electrolyte assembly 108 may include a frame 201 and a flow through field 202.

As used herein, the term "frame" refers to a support or other structure that is configured to retain flow through field 202 in an appropriate position within flow through electrolyte assembly 108. For the sake of illustration and ease of understanding, various embodiments are illustrated and described which include a frame 201 that extends about the entire perimeter of flow through field 202. It should be understood that such embodiments are for the sake of example, and that the term "frame" encompasses support structures that extend about and/or couple with at least a portion of the perimeter of a flow through field. Accordingly, the term "frame" encompasses support structures that extend about and/or couple with at least a portion of a flow through field, and which are configured to maintain the flow through field in an appropriate position within a fuel cell. As described later, the frames described herein may also include one or more inlets for receiving (e.g., a first) electrolyte and one or more outlets for outputting (e.g., a second) electrolyte.

For example and as best shown in FIG. 5, frame 201 may include an inlet 109 for receiving and providing incoming (relatively low concentration) electrolyte to flow through field 202, and an outlet 110 for receiving and transporting an outgoing (relatively high concentration) electrolyte from flow through field 202 out of flow through electrolyte assembly 108.

In this regard, Inlet 109 and outlet 110 may each extend from an outer perimeter of frame 201 to flow through field 202. Without limitation, inlet 109 and outlet 110 in some embodiments are in the form of a bore or channel that is formed within the thickness of frame 201, as shown in FIG. 2. In such instances, the diameter of the bore or channel used to form inlet 109 and outlet 110 may vary widely, e.g., depending upon the desired overflow rates of the electrolyte and the size of the flow through field. For example, the diameter of such bore or channel may range from about 1 to about 7 mm, such as about 1.5 to about 6.5 mm, or even about 1.6 mm to about 6.4 mm.

In some embodiments, the incoming and outgoing electrolytes may be the same type of electrolyte but may differ in concentration. For example, in some embodiments the incoming and outgoing electrolyte may both include hydrochloric acid, wherein the concentration of hydrochloric acid in the incoming electrolyte is less than the concentration of hydrochloric acid in the outgoing electrolyte. Put in other terms, in some embodiments the incoming electrolyte may contain an incoming (e.g., relatively dilute/weak) concentration of hydrochloric acid (e.g., ranging from about 0.1 to less than or equal to about 2.0 Normal (N)) and the outgoing electrolyte may contain an outgoing (relatively strong/concentrated) concentration of hydrochloric acid (e.g., greater than or equal to about 2.0 N), wherein the incoming concentration is less than the outgoing concentration.

As may be appreciated, the outgoing electrolyte may be formed within flow through field 202, e.g., by the reaction of $H^+$ and $Cl^-$ to form HCl in the presence of the incoming electrolyte. That is, the HCl concentration of the incoming electrolyte may increase as $H^+$ and $Cl^-$ react in flow through field 202 to form HCl, resulting in the formation of the outgoing electrolyte. Therefore as fuel cell 100 operates, HCl may be continuously formed within flow through field 202 in the presence of the incoming (e.g., relatively weak) electrolyte. The resulting outgoing (relatively strong) electrolyte may then "pool" near the bottom of flow through field 202, whereupon it may be removed from flow through electrolyte assembly 108 via outlet 110.

While the foregoing description specifically mentions the use of hydrochloric acid as the incoming and outgoing electrolytes, it should be understood that other electrolytes may also be used. For example, in some embodiments the incoming electrolyte may be or include a weak aqueous sulfuric acid, phosphoric acid, nitric acid, or acetic acid solution, and the outgoing electrolyte may include the weak aqueous acid solution as well as hydrochloric acid.

Frame 201 may be formed from any material that may suitably withstand the environment of fuel cell 100. More specifically, frame 201 may preferably be formed from a material that is non-reactive with the incoming and outgoing electrolyte, and which particularly is non-reactive with HCl at the concentrations levels present in the incoming and outgoing electrolytes. The frame may also be configured to withstand the significant compressive forces that may be applied in the assembled fuel cell 100, e.g., to facilitate contact between flow through electrolyte assembly 108, anode assembly 102, and cathode assembly 106 and/or to provide a leak-free assembly. With this in mind, non-limiting examples of materials that may be used to form frame 201 include polycarbonate, polytetrafluoroethylene, non-porous ceramic, combinations thereof, and the like.

Flow through field 202 may generally function as a solid electrolyte support region that facilitates the diffusion and reaction of $H^+$ and $Cl^-$ to form HCl. Moreover, flow through field 202 may function to transport the incoming electrolyte (e.g. relatively dilute HCl) throughout its volume to facilitate good contact between the reactants ($H^+$ and $Cl^-$) and the electrolyte, as well as to transport the outgoing electrolyte (e.g., relatively concentrated HCl) to a bottom region of flow through field 202, where it may be removed by outlet 110. Therefore flow through field 202 in some embodiments may include a plurality of channels, crevices, pores, etc., which may "wick" the incoming and outgoing electrolytes to appropriate regions, e.g., via capillary or other effects.

With the foregoing in mind, in some embodiments flow through field 202 is made of a porous plastic material that may withstand the conditions of fuel cell 100, and which may transport the incoming and outgoing as discussed above. In particular, flow through field is preferably formed from a porous plastic material that is non-reactive with hydrochloric acid in the concentrations present in the incoming and outgoing electrolytes noted above. Non-limiting examples of suitable porous plastics that may be used include porous polyethylene (PE), polypropylene (PP), polytetrafluoroethylene (PTFE), polyvinylidene fluoride (PVDF), polycarbonate, and the like, which may be hydrophilic or hydrophobic. Without limitation, flow through field is a hydrophilic porous polyethylene, such as but not limited to those that are commercially available from Porex Corp. GenPore® Corp., and Atlas Minerals and Chemicals, Inc. The pore size of the porous plastic material used to form flow through field 202 may vary widely. In some embodiments, the average pore size of the porous plastic material may range from about 1 to about 150 microns, such as about 1 to about 100 microns, about 1 to about 50 microns, about 1 to about 15 microns, or even about 10 microns. Without limitation, flow through field 202 is preferably formed from a porous polyethylene having an average pore size ranging from about 1 to about 50 microns, such as about 30 to about 50 microns.

The outer dimensions of flow through field 202 may vary widely, e.g., based on design considerations and other factors such as the outer dimensions of proton exchange membrane 104, anode assembly 102, and/or cathode assembly 106. Without limitation, the outer dimensions of flow through field 202 may be defined by frame 201, and/or may substantially correspond to the outer dimensions of at least one of anode assembly 102, proton exchange membrane 104, and cathode assembly 106. In some embodiments, the outer dimensions of flow through field 202 are the same or substantially the same as the outer dimensions of proton exchange membrane 104, as best illustrated in FIG. 2.

In some embodiments flow through field 202 may be configured to permit the flow of incoming and/or outgoing electrolyte under relatively low pressure. Indeed in some embodiments, flow through field may permit the flow of incoming and/or outgoing electrolyte at an electrolyte pressure ranging from about 1 to about 5 pounds per square inch (psi).

While frame 201 and flow through field 202 may be configured such that flow through field 202 may be offset from an axis of proton exchange membrane 104, anode assembly 102, and/or cathode assembly 106, such construction is not required. Indeed in non-limiting preferred embodiments frame 201 and flow through field 202 are constructed such that an axis extending longitudinally through a center of flow through field 202 is substantially aligned with at least one corresponding axis extending through a center of anode assembly 102, proton exchange membrane 104, and/or cathode assembly 106. This concept is best illustrated in FIG. 2, wherein a center of flow through field 202 is depicted as substantially aligned with a center of anode assembly 102, proton exchange membrane 104, and cathode assembly 106. More particularly, a center of flow through field 202 is depicted in the embodiment of FIG. 2 as being substantially aligned with a center of an opening formed in frame 201.

As illustrated in FIG. 5, in some embodiments flow through field 202 is snuggly fitted within frame 201. With this in mind, the thickness of frame 201 (and, more generally, of flow through electrolyte assembly 108) may vary widely. In some embodiments for example frame 201 may have a thickness ranging from about $1/16^{th}$ to about 2 inches (about 1.587 to about 50.8 millimeters), about $1/8^{th}$ to about 1 inches (about 0.125 to about 25.4 millimeters), or even about $1/8^{th}$ to about ½ inches (about 0.125 to about 12.2 millimeters). In some embodiments, frame 201 is formed from polycarbonate that is about $1/8^{th}$ of an inch (about 0.125 millimeters) thick. The thickness of flow through field 202 may be the same or different from the thickness of frame 201. Without limitation, the thickness of flow through field 202 in some embodiments is the same or substantially the same as the thickness of frame 201, as illustrated in FIG. 2.

With further reference to FIG. 1, as fuel cell 100 is operated, incoming electrolyte (e.g., relatively dilute HCl) may be provided to flow through electrolyte assembly 108 via inlet 109. Inlet 109 may deliver the incoming electrolyte through frame 201 to flow through field 202. The incoming electrolyte may then wick through or otherwise disperse within flow through field 202. $H^+$ ions transported through proton exchange membrane 104 and $Cl^-$ ions generated at cathode assembly 106 may flow into and disperse within flow through field 202, where they mix with one another in the aqueous phase of the incoming electrolyte. The HCl concentration and temperature of the incoming electrolyte may therefore increase as the cell operates, resulting in the formation of the outgoing electrolyte (e.g., a relatively concentrated, relatively hot aqueous HCl solution). The outgoing electrolyte may pool in the bottom region of flow through field 202, where it may be removed from flow through electrolyte assembly 108. As may be appreciated, fuel cell 100 is a dynamic system in which the production of HCl, heat, and electricity may continue as long as the supply of $H_{2(g)}$ and $Cl_{2(g)}$ and the removal of HCl and heat are sustained at constant rates. Under such conditions a steady output of electricity may be achieved concurrently with the production of HCl.

Removal of the outgoing electrolyte may allow heat produced by the reaction of $H^+$ and $Cl^-$ to be effectively removed from flow through electrolyte assembly 108. This may control the operating temperature of fuel cell 100. Fuel cell 100 may therefore operate at a relatively low temperature compared to prior known $H_2$—$Cl_2$ fuel cells. In some embodiments, the operating temperature for fuel cell 100 may range from about 10° C. to about 80° C. This may improve the efficiency of fuel cell 100 by allowing it to operate at a temperature that is relatively close to room temperature, since the cell reaction is exothermic. In addition, removing heat from the cell may reduce the thermal impact on the current produced by the cell, e.g., by reducing and/or minimizing cell over potential resulting from the impact of heat on the charge conducting components of the cell.

While the present disclosure envisions embodiments in which new incoming electrolyte (e.g., new dilute HCl) is introduced as fuel cell 100 is operated, the introduction of new incoming electrolyte is not required. Indeed, the use of flow through electrolyte assembly opens avenues to recycling and or recirculation of at least a portion of the outgoing electrolyte back to the inlet 109, wherein it may again be used as incoming electrolyte in fuel cell 100 as noted above. In some embodiments for example, the outgoing (relatively hot, relatively concentrated) electrolyte may be cooled after it is removed from flow through electrolyte assembly 108. Cooling of the outgoing electrolyte may be performed in any manner, such as via a heat exchanger or other cooling equipment that may actively or passively cool the outgoing electrolyte to within a desired temperature range, e.g., between about 10° C. to about 80° C. Thereafter, all or a portion of the cooled outgoing electrolyte may be redirected back to inlet 109, where it can again be used as incoming electrolyte in fuel cell 100.

As may be appreciated, if outgoing electrolyte is recirculated back to the cell for use as incoming electrolyte during the operation of fuel cell 100, the HCl concentration in electrolyte assembly 108 may increase due to the production of HCl by the cell. As the concentration of HCl the $Cl^-$ concentration may limit the dissociation of the $Cl_2$ on the cathode electrode. The consumption of $Cl_2$ input gas may therefore be increasingly hindered and may eventually be prevented, thereby limiting or preventing the further generation of electricity by the cell. Similarly, as the concentration of HCl increases, the $H^+$ concentration may limit the dissociation of the $H_2$ on the anode electrode. The consumption of $H_2$ input gas may therefore be increasingly hindered and may eventually be prevented, thereby limiting or preventing the further generation of electricity by the cell.

To address this issue the outgoing electrolyte may be processed to produce relatively dilute electrolyte. In particular, the outgoing electrolyte may be processed, e.g., with an HCl extractor, to extract HCl from the stream of outgoing electrolyte, i.e., so as to reduce the HCl concentration of the outgoing electrolyte stream (e.g., to a concentration between about 0.1 N about 2.0 N HCl). The harvested HCl may then be collected for disposal or further processed for as commercial product.

The performance of fuel cell 100 may be evaluated by characterizing its activation over potential, it's ohmic over potential, and/or its concentration over potential. In some embodiments fuel cell 100 exhibits an activation over potential ranging from about 0.05 to about 0.08V, i.e., about 3.6 to about 5.6% of the theoretical maximum of 1.38V. Alternatively or additionally, fuel cell 100 may exhibit an ohmic over potential of about 0.09 to about 0.12V (e.g., about 1V), i.e., about 6.5 to about 8.6% (e.g., about 7.2%), relative to the theoretical maximum of 1.38V. Still further, fuel cell 100 in some embodiments may exhibit a concentration over potential ranging from about 0.01 to about 0.04V (e.g., about 0.02V), i.e., about 0.7 to about 2.8% (e.g., about 1.4%) of the theoretical maximum of 1.38V. In some embodiments, the overall over potential of cell 100 may range from about 0.05V to about 0.2V (e.g., about 0.13V), representing a loss of about 3.6 to about 14.5% (e.g., about 13%) of the theoretical maximum voltage of 1.38V.

As noted above, in some embodiments of the present disclosure anode assembly 102 may be in the form of a multilayer structure that includes a gas diffusion layer, conductive support, and anode catalyst. In this regard reference is made to FIG. 3, which depicts one example configuration of anode assembly 102 consistent with the present disclosure. As shown in the illustrated embodiment anode assembly 102 may have a multilayer construction that includes conductive support 301, gas diffusion layer 302, and anode catalyst 303.

Conductive support 301 may be any suitable conductive support, provided that it exhibits both electrical conductivity and may permit the passage of $H_2$ gas to anode catalyst 303. Conductive support 301 may also provide mechanical support for the application of a gas diffusion layer (GDL) and electrode catalysts, as will be discussed below. Without limitation, conductive support 301 is preferably in the form of conductive paper that has been optionally wet proofed with a wet-proofing agent. Non-limiting examples of conductive paper that may be used to form conductive support 301 include carbon papers, such as but not limited to the carbon papers sold by Toray Advanced Materials (e.g., Toray Carbon Paper TGPH120). Other suitable materials include carbon impregnated glass wool, phenolic resin and carbon fiber, carbon nanotubes, and the like. Of course, other conductive/carbon papers may be used in the formation of conductive support 301, and are envisioned by the present disclosure. Gas diffusion layer 302 is generally configured to provide a gas diffused pathway for $H_2$ gas arriving from the region adjacent anode assembly 102 (e.g., from first gas manifold 101) to anode catalyst layer 403. In addition, gas diffusion layer 302 may help to control the amount of moisture reaching catalyst 303, e.g., so as to prevent flooding of the catalyst. Gas diffusion layer 302 may also function to retain some amount of moisture on its surface to promote proper functioning of proton exchange membrane 104.

Figures 3, 4:
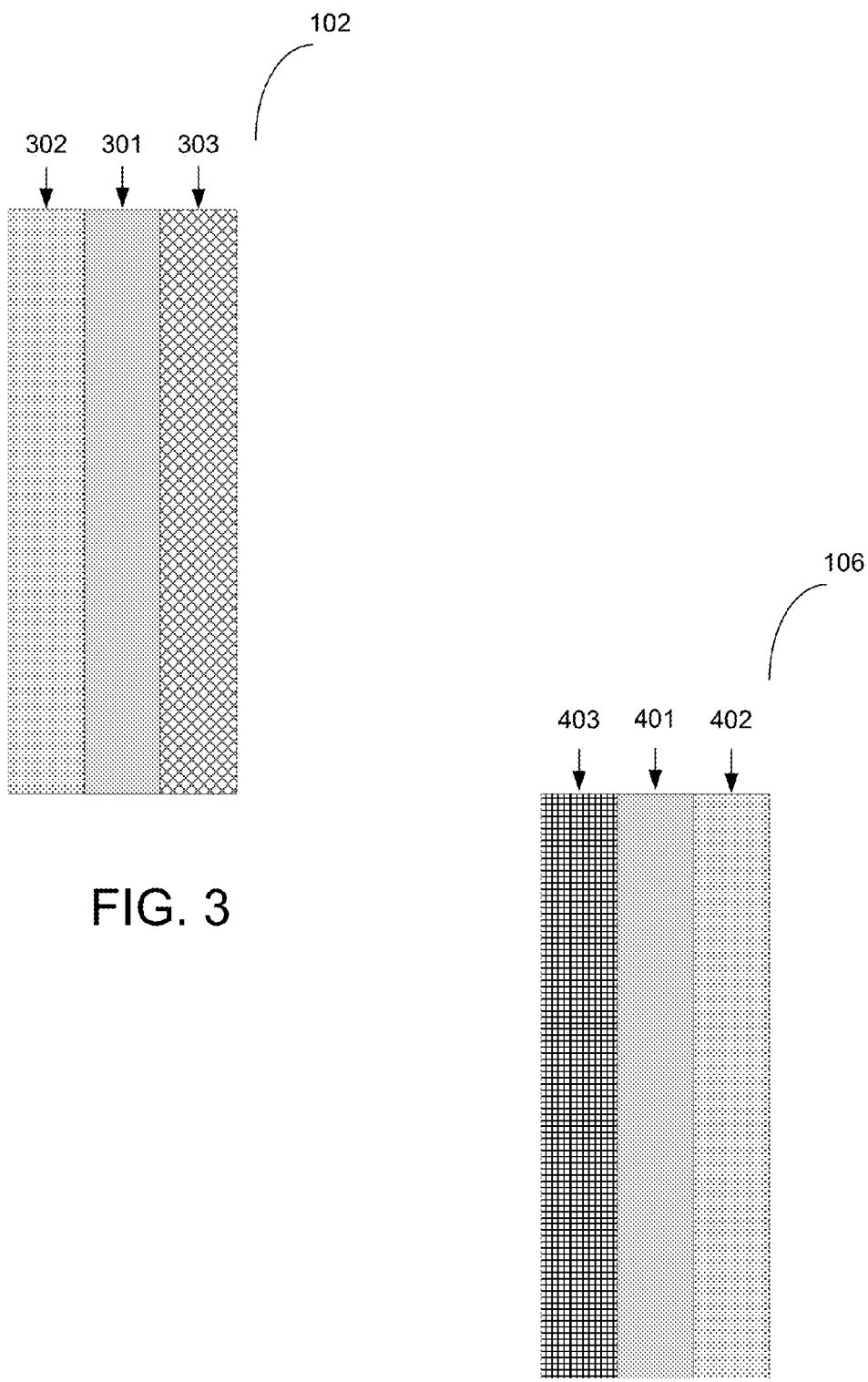
FIG. 3 is a cross sectional diagram of one example of an anode assembly consistent with the present disclosure.
FIG. 4 is a cross sectional diagram of one example of a cathode assembly consistent with the present disclosure.

For the sake of illustration and ease of understanding, FIG. 3 depicts an embodiment in which gas diffusion layer 302 is formed on only one side of conductive support 301. The catalyst layer 303 is formed on the opposite side of the conductive support 301. However it should be understood that gas diffusion layer 302 may be formed on either side of conductive support 301, e.g., since it may be made of uniform materials. In this regard gas diffusion layer 302 may be formed at least in part by coating or impregnating one or more sides of conductive support 301 with conductive particles. For example, in some embodiments conductive (e.g., carbon) particles are coated and/or impregnated on/into one side of conductive support 401, e.g., so as to form a distinct gas diffusion layer as illustrated in FIG. 3. Alternatively, conductive (e.g., ultrafine carbon) particles may be impregnated throughout the entire thickness of conductive support, in which gas diffusion layer 302 may be understood as integral with or interspersed within conductive support 301. In some embodiments, conductive carbon particles are applied to one side of conductive support 301 to form a gas diffusion layer, and the gas diffusion layer is coated with a wet proofing agent.

Without limitation, anode assembly 102 is preferably oriented within fuel cell 100 such that gas diffusion layer 302 is oriented away from flow through electrolyte assembly 108. That is, anode assembly 102 is preferably oriented such that gas diffusion layer faces anode gas manifold 101.

Any suitable conductive particles may be used to coat or impregnate conductive support 301 so as to form gas diffusion layer 302. Non-limiting examples of such particles include graphite (carbon) particles such as carbon black and carbonized lignin, conductive glass powder, conductive mica powder, conductive polyaniline, combinations thereof, and the like. Without limitation the conductive particles are preferably carbon black particles. Non-limiting examples of suitable carbon black particles that may be used for this purpose include the carbon black particles sold by CABOT® Corporation under the name VULCAN® XC-72.

The particle size of the conductive particles may vary widely. For example, in some embodiments the particles size of the conductive particles may range from about 20 nm to about 250 nm. Without limitation, carbon black particles having a particle size ranging from about 30 nm to about 50 nm are used.

The amount of conductive particles used in gas diffusion layer 302 may vary widely. In some embodiments the amount of conductive particles applied to conductive support 301 to form gas diffusion layer 302 may range from about 0.5 to about 3.0 mg per square centimeter of conductive support 301 (~0.5-3.0 mg/cm$^2$), such as about 1 to about 2.5 mg per square centimeter of conductive support 301 (~1-2.5 mg/cm$^2$), about 1.2 to about 2 mg per square centimeter of conductive support 301, or even about 1.5 to about 1.6 mg per square centimeter of conductive support 301 (~1.5-1.6 mg/cm$^2$). In some embodiments, conductive particles (e.g., carbon black) in the amount of 1.56 mg per square centimeter of conductive support 301 are coated on or impregnated into a first side of conductive support 301.

Coating or impregnation of the conductive particles on/into conductive support 301 may be performed in any suitable manner. For example, the conductive particles may be coated or impregnated by applying a suspension of conductive particles to the conductive paper used in conductive support 301, e.g., via painting, spraying, combinations thereof, and the like.

Inhomogeneity of the amount and/or type of conductive particles applied to conductive support 301 can lead to variations in performance from electrode to electrode. It may therefore be desirable to exert control over the distribution of conductive particles on or within conductive support 301. With this in mind, in some embodiments the conductive particles are homogenously distributed on or within conductive support 301. In other embodiments, the conductive particles may be applied such that a gradient in the concentration of conductive particles is formed on or within conductive support 401. Without limitation, the conductive particles are preferably homogenously or substantially homogenously distributed on or within the conductive paper.

The performance of fuel cell 100 may be affected by the hydration of proton exchange membrane 104, which in turn may be affected by the efficiency of dissociation of $H_2$ by the anode catalyst 303, which in turn may be affected by the amount of moisture that is allowed to penetrate anode assembly 102 (i.e., the wet proofing of anode assembly 102). To enhance the wet proofing of anode assembly 102 in some embodiments gas diffusion layer 302 may be coated or impregnated with a wet-proofing agent. Non-limiting examples of suitable wet proofing agents include polytetrafluoroethylene (PTFE), a polyethylene latex emulsion, combinations thereof, and the like. Without limitation, the wet-proofing agent coated on or impregnated into the conductive paper used in conductive support 301 is preferably PTFE.

The amount of wet proofing agent coated or impregnated into gas diffusion layer 302 may vary widely. In some embodiments the amount of wet proofing agent coated on or impregnated into gas diffusion layer 302 may range from about 20 to about 50% by weight, such as about 30 to about 50% by weight, or even about 40 to about 50% by weight.

Coating or impregnation of the wet proofing agent on/into gas diffusion layer 302 may be performed in any suitable manner. In some embodiments the wet proofing agent may be applied to gas diffusion layer 302 in a similar manner as the conductive particles, e.g., by applying a solution/dispersion of wet proofing agent (first wet proofing solution) to the conductive paper, e.g., via painting, spraying, combinations thereof, and the like.

Although the present disclosure envisions embodiments in which the conductive particles and wet proofing agent are applied independently of one another, application of the conductive particles and wet proofing agent need not occur in that manner. Indeed in some embodiments, the wet proofing agent and conductive particles may be applied simultaneously, e.g., by painting, spraying, or otherwise applying a suspension of the conductive particles in an aqueous solution/dispersion of wet proofing agent to the conductive paper used in conductive support 301. In such embodiments the suspension may be formed for example by forming an aqueous anode assembly wet proofing solution/dispersion containing a desired amount of wet proofing agent, and adding a desired amount of conductive particles into a specified volume of the anode assembly wet proofing solution/dispersion.

The concentration of wet proofing agent in the anode assembly wet proofing solution/dispersion may range from about 20 to about 50 weight %, such as about 30 to about 50 weight %, about 40 to about 50 weight %, or even about 50 weight %. For each milligram of conductive particles, the volume of the anode assembly wet proofing solution may range from about 5 to about 20 microliter (µL), such as about 7.5 to about 15 µL, about 10 to about 12.5 µL, or even about 15 µL. As one non-limiting example of an anode assembly wet proofing solution/dispersion that may be used, mention is made of a 40% PTFE dispersion formed by diluting the aqueous 60% PTFE dispersion sold by DUPONT® Corp. under the designation TEFLON® PTFE TE-3859 with water.

Once the desired volume of anode assembly wet proofing solution/dispersion per unit weight of conductive particles is known, the suspension may be formed by measuring out an appropriate amount of anode assembly wet proofing solution and conductive particles, and then dispersing the conductive particles in the anode assembly wet proofing solution/dispersion. Dispersing the conductive particles in the anode assembly wet proofing solution may be performed in any suitable manner, e.g., by hand or mechanical mixing, vortex mixing, combinations thereof, and the like. Without limitation, in some embodiments a suspension of about 1 to about 2 milligrams (e.g., 1 milligram) of conductive particles (e.g., carbon black) per about 5 to about 15 milliliters of an anode assembly wet proofing solution/dispersion containing about 40 weight % of wet proofing agent (e.g., PTFE) may be used.

Following application of the conductive particles and/or the anode assembly wet proofing solution, the resulting first subassembly (of conductive support 301 and gas diffusion layer 302) may be dried at ambient or elevated temperature. Subsequent to drying, the conductive support 301 may be optionally heat treated, e.g., at a temperature ranging from about 300 to about 400° C. for about 20 to about 40 minutes. Without limitation, the first subassembly assembly is preferably heat treated at about 350 to about 370° C. for about 20 to about 30 minutes.

In some embodiments gas diffusion layer 302 may be subject to additional wet proofing after first subassembly is dried and optionally heat treated. Such additional wet proofing may be accomplished for example by applying one or more layers of additional wet proofing agent to gas diffusion layer 302. In some embodiments about 1 to about 10 additional layers of wet proofing agent are applied to gas diffusion layer 302, such as about 1 to about 7 about 1 to about 5, or even about 1 to about 3. In specific non-limiting embodiments, 1 or 4 additional layers of wet proofing agent are applied to gas diffusion layer.

When desired, the additional layers of wet proofing agent may be applied to gas diffusion layer 302 in any suitable manner. In some embodiments, such layers are applied by coating gas diffusion layer 302 with a second wet proofing solution/dispersion to gas diffusion layer 302.

The type of wet proofing agent in the second wet proofing solution/dispersion may be the same or different as the anode assembly wet proofing solution/dispersion. Without limitation, the type of wet proofing agent in the second wet proofing solution/dispersion is preferably the same as the type of wet proofing agent in the anode assembly wet proofing solution/dispersion. Thus for example where PTFE is used as the wet proofing agent in the anode assembly wet proofing solution/dispersion, PTFE may also be used as the wet proofing agent in the second wet proofing solution/dispersion.

The concentration of wet proofing agent in the second wet proofing solution/dispersion may vary widely. Thus for example, the concentration of wet proofing agent in the second wet proofing solution/dispersion may range from about 20 to about 80 weight %, such as about 30 to about 80 weight %, about 40 to about 80 weight %, or even about 80 weight %. Accordingly, the concentration of wet proofing agent in the second wet proofing solution/dispersion may be the same or different as the concentration of wet proofing agent solution/dispersion in the anode assembly wet proofing solution/dispersion. Without limitation, the anode assembly wet proofing agent solution/dispersion preferably contains a first concentration of wet proofing agent and the second wet proofing agent solution contains a second concentration of wet proofing agent, wherein the first and second concentrations are different. In some embodiments, the first concentration is lower (e.g., about 40% by weight) than the second concentration (e.g., about 60 weight %).

As noted previously one or more additional layers of wet proofing agent may be applied to gas diffusion layer 302 by the application of a second wet proofing solution/dispersion.

With this in mind, each layer of additional wet proofing agent is preferable dried and optionally heat treated prior to the application of a subsequent layer of additional wet proofing agent. For example, in some embodiments an additional wet proofing layer may be formed on gas diffusion layer 302 by depositing an amount of second wet proofing agent solution/dispersion thereon. Following deposition the resulting subassembly may be allowed to dry at ambient or elevated temperature. Following drying, the subassembly may be heat treated to form the first additional wet proofing layer. Heat treatment may be performed for example at about 300 to about 400° C. for about 10 to about 30 minutes. Following heat treatment, a second additional wet proofing layer may be formed on the first additional wet proofing layer in the same manner. Third, fourth, etc. layers may thereafter be formed, until the additional wet proofing layers and/or gas diffusion layer reach a desired weight % of water proofing agent to carbon black.

Anode catalyst 303 generally functions to catalytically oxidize $H_2$ to $H^+$, as generally described above. In this regard, anode catalyst may be in the form of a porous or particulate layer that includes any catalyst having catalytic activity with respect to the oxidation of $H_2$ to $H^+$. Non-limiting examples of anode catalysts that may be used include platinum and platinum containing catalyst, titanium/ruthenium/iridium trimetallic catalysts, tungsten oxides and silicates, combinations thereof, and the like. In any case, such catalysts may be supported (e.g., on particles or within pores, channels, etc. of a host layer), or unsupported. Without limitation, the anode catalyst is preferably a catalyst that is supported on conductive particles, such as but not limitation conductive carbon (e.g., graphite particles). As one non-limiting example of suitable conductive particles for supporting the anode catalyst, mention is made of a 5-20 weight % of platinum on carbon powder catalyst, such as a 10% platinum on carbon powder catalyst.

The amount of catalyst in anode catalyst 303 may vary widely. In some embodiments for example the amount of catalyst (e.g., Pt) in anode catalyst 303 may range from about 0.5 to about 2 milligrams (mg) per square centimeter (e.g., about 0.5 to about 1.5 mg/cm² or even about 1.0 mg/cm²) of the surface area of conductive support 301 to which anode catalyst 303 is to be applied. Without limitation, anode catalyst 303 preferably contains a platinum catalyst in an amount of about 1.0 mg/cm² of conductive support 301.

Anode catalyst 303 may be applied by spraying, brushing, etc. an aqueous mixture (e.g., paste) of unsupported or supported anode catalyst onto the surface of conductive support 301 that is opposite gas diffusion layer 302, as illustrated in FIG. 3. In this regard, an aqueous mixture and/or paste of anode catalyst may be formed for example by mixing a desired amount of unsupported or supported catalyst, after which the mixture and/or paste may be applied to conductive support 301. In some embodiments, the amount of water in the anode mixture and/or paste may range from about 0.1 to about 2 microliters per milligram (μL/mg) of anode catalyst, such as about 0.2 to about 1 μL/mg of anode catalyst, about 0.3 to about 0.9 μL/mg of anode catalyst, or even about 0.8 μL/mg of anode catalyst. In some embodiments, the amount of water in the anode mixture and/or paste is about 0.83 μL/mg of anode catalyst.

Following application of the mixture and/or paste, the resulting wet catalyst layer may be dried, e.g., at ambient or elevated temperature.

When fuel cell 100 is assembled, anode assembly 102 may be oriented such that anode catalyst 303 is proximate to and in contact with proton exchange membrane 104, whereas diffusion layer 302 is distal from proton exchange membrane 304 With this in mind, binder polymers or copolymers may optionally be incorporated into and/or coated on anode catalyst 303, e.g., to improve adhesion and/or close contact of anode catalyst 303 to proton exchange membrane 104. Although any suitable type of binder polymers may be used, in some embodiments the binder polymers are one or more of the same ionomer(s) used in proton exchange membrane 104. By way of example, where proton exchange membrane 104 includes an ionomer such as an ionic polytetrafluoroethylene (e.g., a sulfonated polytetrafluoroethylene), the binder polymer incorporated into and/or coated on to anode catalyst 303 may also be an ionic polytetrafluoroethylene, such as a sulfonated polytetrafluoroethylene.

Any suitable method may be used to incorporate binder polymers into anode catalyst 303. For example, in some embodiments binder polymers may be added to the anode catalyst mixture and/or paste, prior to the formation of anode catalyst 303. In some embodiments, the binder polymers are a stabilized perfluorosulfonic acid/PTFE copolymer in the acid ($H^+$) form. In such instances the PTFE (or other binder polymers) may be dispersed in a medium (e.g., an alcohol) and mixed into the anode catalyst mixture and/or paste in a desired amount. In some embodiments, the binder polymers are provided in the form of an aqueous 5% solution of sulfonated PTFE polymers, and are added to the anode catalyst mixture and/or paste in an amount ranging from about 4 to about 10 μL/mg (e.g., about 5 to about 8 μL/mg of catalyst, or even about 6 to about 7 μL/mg of catalyst) of anode catalyst in the anode catalyst mixture and/or paste.

The resulting mixture of binder polymers and anode catalyst may then be applied to the surface of conductive support 301, e.g., in the same manner as outlined above with respect to the application of the anode catalyst alone. In such embodiments, the binder polymers may be homogenously, substantially homogenously, or non-uniformly distributed within anode catalyst 303.

Alternatively or in addition to the incorporation of binder polymers into anode catalyst 303, binder polymers may be deposited on a surface of anode catalyst 303. Deposition of binder polymers on the surface of anode catalyst 303 may be accomplished in any suitable manner. For example, binder polymers may be added to an alcohol such as isopropanol to form a slurry, after which the slurry may be applied to the surface of anode catalyst 303 and dried. As a result, a layer of binder polymer which is homogenously or non-uniformly distributed across the surface of anode catalyst may be formed.

As noted above, in some embodiments of the present disclosure cathode assembly 106 may be in the form of a multilayer structure that includes a gas diffusion layer, conductive support, and cathode catalyst. In this regard reference is made to FIG. 4, which depicts one example configuration of cathode assembly 106 consistent with the present disclosure. As shown in the illustrated embodiment cathode assembly 106 may have a multilayer construction that includes conductive support 401, gas diffusion layer 402, and cathode catalyst 403. The structure and preparation of conductive support 401 and gas diffusion layer 402 in anode assembly 106 of FIG. 4 is the same as the structure and preparation of conductive support 301 and gas diffusion layer 302 described above in connection with FIG. 3. Therefore for the sake of brevity the structure and preparation of such layers is not reiterated.

Turning now to cathode catalyst 403, cathode catalyst 403 may include any catalyst having suitable catalytic activity for the reduction of $Cl_2$ to $Cl^-$. Non-limiting examples of suitable cathode catalysts include platinum catalysts, ruthenium catalysts such as $RuO_2$, combinations thereof, and the like. Without limitation, cathode assembly 106 preferably includes a ruthenium (e.g. $RuO_2$) as a cathode catalyst. In any case, the catalyst may be supported (e.g., on particles or within pores, channels, etc. of a host layer), or unsupported. Without limitation, the cathode catalyst is preferably unsupported $RuO_2$.

The amount of catalyst in cathode catalyst 403 may vary widely. In some embodiments for example the amount of catalyst (e.g., Ru) in cathode catalyst 403 may range from about 0.5 to about 2 milligrams (mg) per square centimeter (e.g., about 0.5 to about 1.5 $mg/cm^2$ or even about 1.0 $mg/cm^2$) of the surface area of conductive support 401 to which cathode catalyst 403 is to be applied. Without limitation, cathode catalyst 403 preferably contains an unsupported $RuO_2$ catalyst in an amount of about 1.0 mg of ruthenium per square centimeter of conductive support 401.

Cathode catalyst 403 may be applied by spraying, brushing, etc. an aqueous mixture or paste of unsupported or supported cathode catalyst onto the surface of conductive support 401 that is opposite gas diffusion layer 402, as illustrated in FIG. 4. In this regard, the aqueous mixture and/or paste of cathode catalyst 403 may be formed for example by mixing a desired amount of unsupported or supported catalyst in water to form an cathode catalyst mixture and/or paste (slurry), after which the mixture and/or paste may be applied to conductive support 301. In some embodiments, the amount of water in the cathode mixture and/or paste may range from about 2 to about 5 microliters per milligram (μL/mg) of cathode catalyst, such as about 2 to about 4 μL/mg of cathode catalyst, about 3 to about 4 μL/mg of cathode, or even about 3 to about 3.5 μL/mg of cathode catalyst. In some embodiments, the amount of water in the cathode mixture and/or paste is about 3.33 μL/mg of cathode catalyst.

For wet proofing or other purposes, a wet proofing agent may be added to the cathode catalyst mixture and/or paste prior to the formation of cathode catalyst 403. Suitable wet proofing agents include those noted above, including but not limited to polytetrafluoroethylene. In some embodiments, polytetrafluoroethylene is added to the cathode mixture and/or paste. Addition of polytetrafluoroethylene to the cathode mixture and/or paste may be accomplished in any suitable manner. By way of example, polytetrafluoroethylene may be added by mixing a desired amount of an aqueous polytetrafluoroethylene solution to the cathode catalyst mixture and/or paste. In some embodiments, a 20-60% solution of polytetrafluoroethylene is added to the cathode mixture and/or paste in an amount ranging from about 1 to about 30 μL/mg of cathode catalyst, such as about 6 to about 24 μL/mg of cathode catalyst, or even about 10 to about 20 μL/mg of cathode catalyst. In some embodiments, about 12 μL of a 40% aqueous PTFE solution is added to the cathode mixture and/or paste per milligram of cathode catalyst contained therein.

In any case, following application of the cathode catalyst mixture and/or paste to conductive support 401, the resulting wet catalyst layer may be dried, e.g., at ambient or elevated temperature. When fuel cell 100 is assembled, cathode assembly 106 may be oriented such that cathode catalyst 401 is proximate to and in contact with electrolyte assembly 108, whereas diffusion layer 402 is distal from electrolyte assembly 108.

As described above, the fuel cells of the present disclosure may include one or more features that can limit or prevent reduction in cell efficiency, e.g. due to thermal effects, over potentiation, and/or hindered proton exchange membrane performance. With this in mind, the cells described herein may be configured to exhibit relatively high efficiency as compared to prior know $H_2$—$Cl_2$ PEM fuel cells. For example in some embodiments, the efficiency of the fuel cells described herein may range from greater than 75% to about 95%, such as greater than about 80 to about 90%. In some embodiments, the efficiency of the cells described herein is about 85 to about 88%, such as about 87%. Put in other terms, the cells described herein may produce an output voltage of about 1.03 to about 1.31V, such as about 1.1 to about 1.24V, or even about 1.17 to about 1.21V. In some embodiments, the cells described herein may produce an output voltage of about 1.2V.

Another aspect of the present disclosure relates to fuel cell stacks that include a plurality of $H_2$—$Cl_2$ fuel PEM fuel cells. In the context of the present disclosure, the term "fuel cell stack" means to device that includes two or more fuel cells that may be coupled and/or arrayed to produce a collective electrical output with a voltage that exceeds the output voltage of each individual cell in the stack.

Figure 6:
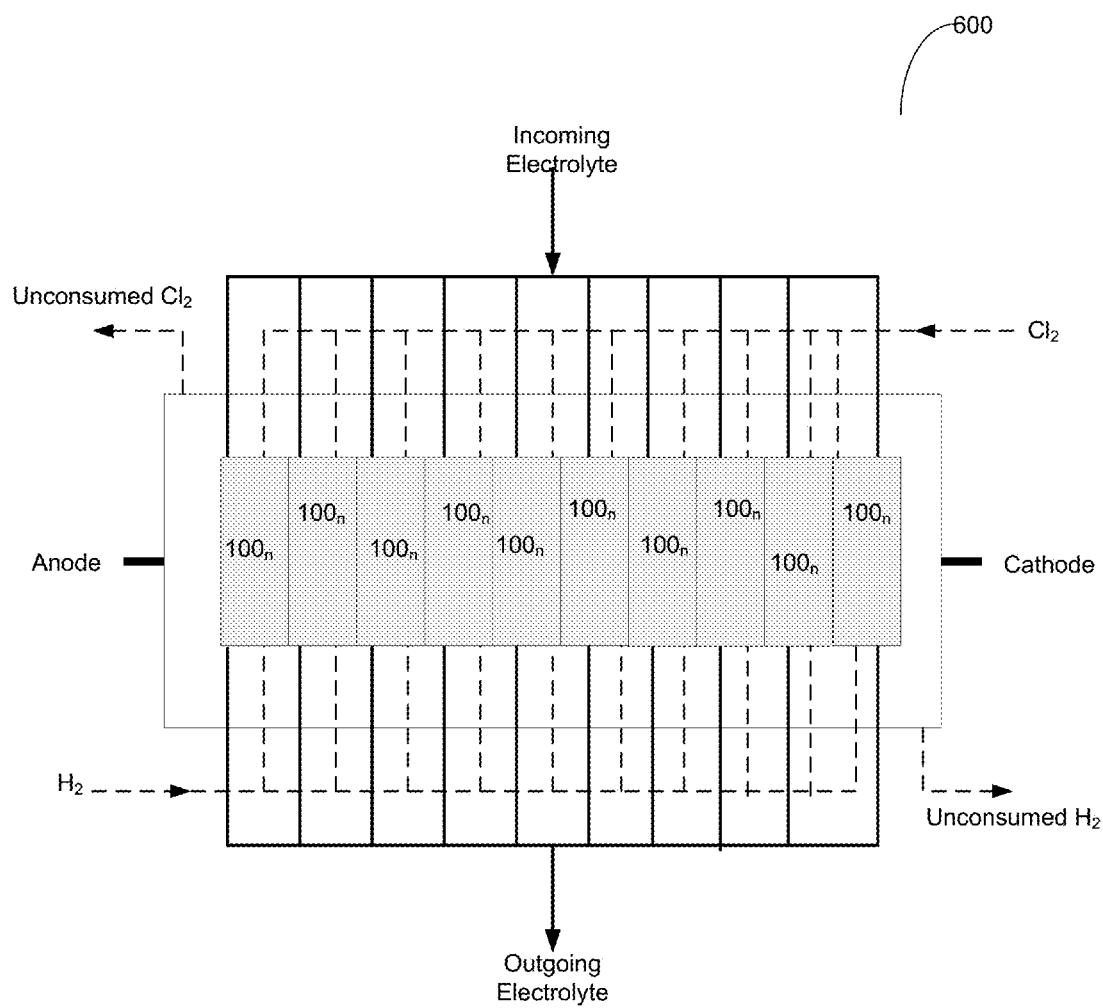
FIG. 6 illustrates one example of an $H_2$—$Cl_2$ fuel cell stack consistent with the present disclosure.

Reference is therefore made to FIG. 6, which depicts one example of a fuel cell stack consistent with the present disclosure. As shown, fuel cell stack includes a plurality of fuel cells $100_n$, which are electrically coupled in series. Each fuel cell $100n$ may be generally configured as described above in connection with FIGS. 1-4, and may each produce an electrical output of about 1 to about 1.3V, such as about 1.2V. For the sake of example FIG. 6 depicts an embodiment in which fuel cell stack includes 10 fuel cells $100n$. When each cell outputs a voltage about 1.2V, it may be understood that fuel cell stack 600 may produce a collective voltage output of about 12V.

Of course, it should be understood that fuel cell 600 need not contain 10 fuel cells, and that any number (n) of fuel cells may be used. Indeed, the present disclosure envisions embodiments in which the number (n) of fuel cells 100 in fuel cell is greater than or equal to about 2, about 5, about 10, about 20, about 50, about 100, or even about 1000 or more. Without limitation, fuel cell stack 600 preferably includes enough fuel cells 100 coupled in series to produce a collective voltage output of about 3V, about 6V, about 12V, about 120V, or even about 240V.

As shown in FIG. 6, $H_2$, $Cl_2$ and incoming electrolyte may be supplied to individual fuel cells $100n$ (n being an integer) in fuel cell stack 600 via gas and electrolyte distribution systems, respectively (not labeled). The outgoing electrolyte produced by each of cells $100n$ may be collected and removed via an outgoing electrolyte collection system, which in some embodiments may be in the form of a plurality of drainage lines that couple an output of the flow through electrolyte assembly in each cell to a common drain. With the exception of these distribution and collection systems the operation of fuel cell stack 600 is generally the same as that of fuel cell 100 described above, and thus is not reiterated for the sake of brevity.

Figure 7:
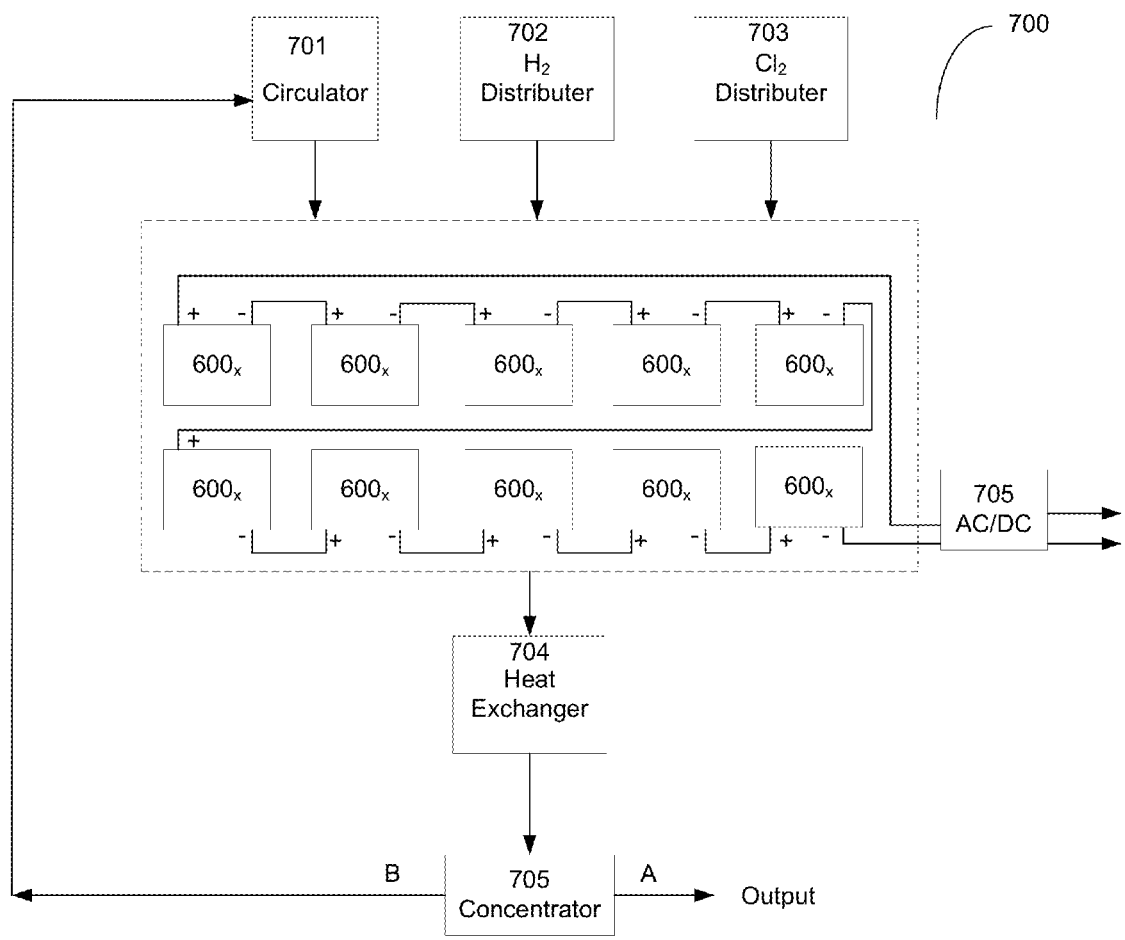
FIG. 7 illustrates one example of a system for HCl production and electricity cogeneration consistent with the present disclosure.

Turning now to FIG. 7, a plurality of fuel cell stacks $600_x$ may be used to form a system 700 for the cogeneration of electricity and hydrochloric acid. Each fuel cell stack $600_x$ may produce electricity at an output voltage ranging from about 3V, about 6V, about 12V, about 120V, or even about 240V. As shown, fuel cell stacks $600_x$ may be electrically coupled in series. As a result, the collective voltage output of system 700 will be the sum of the voltage outputs of fuel cell stacks $600_X$. With this in mind, FIG. 7 depicts an example embodiment in which system 700 includes 10 fuel cell stacks $600_x$ (i.e., x is an integer ranging from 1 to 10) coupled in series, wherein the voltage output of each fuel cell stack is about 12V. As such, the voltage output of system 700 may be about 120V.

Of course, the embodiment of FIG. 7 is for the sake of illustration only, and it should be understood that any number of fuel stacks $600_x$ may be used, such that system 700 produces a desired voltage output. Indeed, the present disclosure envisions embodiments in which system 700 includes about 10, about 20, about 30, about 50, about 100, even about 1000 or more fuel cell stacks $600_x$ coupled in series (i.e., x is an integer ranging from 1 to 1000 or more), so as to produce electricity at voltages ranging from tens to thousands of volts, or even tens of thousands of volts. Without limitation, system 700 is preferably configured to produce electricity at a voltage of about 120 to about 240V.

In the embodiment of FIG. 7, an incoming electrolyte (e.g., HCl) circulator is employed to provide incoming electrolyte to each fuel cell stack $600_x$, which in turn may be configured to deliver incoming electrolyte (e.g., relatively cool, relatively weak HCl) to the inlet of the flow through electrolyte assemblies of the fuel cells contained therein. The outgoing electrolyte (e.g., relatively hot, relatively concentrated HCl) produced by fuel cell stacks $600_x$ may then be collected.

As shown in the embodiment of FIG. 7, in some embodiments the outgoing electrolyte collected from fuel cell stacks 600 may be cooled, e.g., by heat exchanger 704 or other cooling equipment. The concentrated HCl in the cooled outgoing electrolyte may then optionally be separated using concentrator 705, and the resulting dilute electrolyte is recirculated back to fuel stacks $600_x$. Concentrator 705 (e.g. an HCl separator) may process the outgoing electrolyte into a relatively strong HCL output and a relatively weak electrolyte. The strong HCl output may be conveyed to a processor for further collection, processing, and/or disposal. The relatively weak electrolyte may be conveyed back to circulator 701 for reuse in system 700 as incoming electrolyte.

$H_2$ and $Cl_2$ may be respectively supplied to fuel cell stacks $600_x$ by $H_2$ distributor 702 and $Cl_2$ distributor 703. The $H_2$ may be catalytically oxidized to $H^+$ and the $Cl_2$ may be catalytically reduced $Cl^-$ within the fuel cells of fuel cell stacks $600_x$, as described above, so as to produce HCl. The electrons produced by each fuel cell may then be directed to an external load. If desired, the direct current produced by system 700 may be converted to alternating current, e.g., by AC/DC converter 706. The resulting electrical output may then be directed to an external load, e.g., as a source of power.

Other embodiments of the present disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A $H_2$—$Cl_2$ fuel cell, comprising:
   an anode assembly comprising a catalyst to catalytically oxidize $H_2$ to $H^+$
   a cathode assembly comprising a catalyst to catalytically reduce $Cl_2$ to $Cl^-$;
   a proton exchange membrane between the anode assembly and the cathode assembly; and
   a flow through electrolyte assembly between the proton exchange membrane and the cathode assembly, the flow through electrolyte assembly comprising a frame and a porous flow through field;
   and wherein:
   the frame comprises an inlet for receiving an incoming electrolyte and providing said incoming electrolyte to said flow through field; and
   the frame comprises an outlet for receiving an outgoing electrolyte from said flow through field and transporting said outgoing electrolyte out of said flow through electrolyte assembly.

2. The $H_2$—$Cl_2$ fuel cell of claim 1, wherein said incoming electrolyte comprises a relatively dilute concentration of hydrochloric acid, and said outgoing electrolyte comprises a relatively concentrated concentration of hydrochloric acid, wherein said relatively dilute concentration is less than said relatively strong concentration.

3. The $H_2$—$Cl_2$ fuel cell of claim 1, wherein said porous flow through field is formed from porous polyethylene.

4. The $H_2$—$Cl_2$ fuel cell of claim 1, wherein said frame comprises polycarbonate.

5. The $H_2$—$Cl_2$ fuel cell of claim 1, wherein:
   said anode assembly comprises an anode conductive support having opposing sides;
   an anode gas diffusion layer is formed on one side of the anode conductive support;
   an anode catalyst is formed on the side of the anode conductive support opposite the anode gas diffusion layer; and
   the anode catalyst comprises at least one binder polymer.

6. The $H_2$—$Cl_2$ fuel cell of claim 5, wherein said proton exchange membrane comprises an ionomer.

7. The $H_2$—$Cl_2$ fuel cell of claim 6, wherein said ionomer comprises a sulfonated tetrafluoroethylene.

8. The $H_2$—$Cl_2$ fuel cell of claim 5, wherein said at least one binder polymer comprises an ionomer.

9. The $H_2$—$Cl_2$ fuel cell of claim 8, wherein said at least one binder polymer comprises a sulfonated tetrafluoroethylene.

10. The $H_2$—$Cl_2$ fuel cell of claim 5, wherein said anode catalyst comprises platinum.

11. The $H_2$—$Cl_2$ fuel cell of claim 5, wherein said cathode assembly comprises a cathode catalyst, the cathode catalyst comprising ruthenium.

12. The $H_2$—$Cl_2$ fuel cell of claim 5, wherein said cathode assembly comprises:
   a cathode conductive support having opposing sides;
   a cathode gas diffusion layer formed on one side of said cathode conductive support; and
   a cathode catalyst formed on the side of the cathode conductive support opposite the cathode gas diffusion layer.

13. The $H_2$—$Cl_2$ fuel cell of claim 1, wherein said fuel cell produces a voltage ranging from about 1.2 to about 1.3 volts.

14. The $H_2$—$Cl_2$ fuel cell of claim 1, further comprising cooling equipment to receive and cool said outgoing electrolyte from said output, and a recirculator to recirculate at least a portion of said outgoing electrolyte back to said inlet.

15. The $H_2$—$Cl_2$ fuel cell of claim 14, wherein said recirculator comprises an HCl separator to process said outgoing electrolyte into at least a concentrated HCL fraction and a relatively weak electrolyte fraction, and to recirculate the relatively weak electrolyte fraction back to said inlet.

16. A fuel cell stack, comprising a plurality of $H_2$—$Cl_2$ fuel cells coupled in series, wherein each of said plurality of $H_2$—$Cl_2$ fuel cells comprises:
    an anode assembly comprising an anode catalyst to catalytically oxidize $H_2$ to $H^+$
    a cathode assembly comprising a cathode catalyst to catalytically reduce $Cl_2$ to $Cl^-$;
    a proton exchange membrane between the anode assembly and the cathode assembly; and
    a flow through electrolyte assembly between the proton exchange membrane and the cathode, the flow through electrolyte assembly comprising a frame and a porous flow through field;
    and wherein:
        the frame comprises an inlet for receiving an incoming electrolyte and providing said incoming electrolyte to said flow through field;
        the frame comprises an outlet for receiving an outgoing electrolyte from said flow through field and transporting said outgoing electrolyte out of said flow through electrolyte assembly; and
        said fuel cell stack produces a collective voltage output ranging from about 2.4 to about 240V.

17. The fuel cell stack of claim 16, wherein said collective voltage output is about 12V.

18. The fuel cell stack of claim 16, further comprising an electrolyte distribution system to deliver said incoming electrolyte to said input of each of said $H_2$—$Cl_2$ fuel cells and a collection system to receive said outgoing electrolyte from said output of each of said H2-$Cl_2$ fuel cells.

19. The fuel cell stack of claim 16, wherein said incoming electrolyte comprises a relatively dilute concentration of hydrochloric acid, and said outgoing electrolyte comprises a relatively concentrated concentration of hydrochloric acid, wherein said relatively dilute concentration is less than said relatively concentrated concentration.

20. The fuel cell stack of claim 16, wherein the porous flow through field is formed from porous polyethylene.

21. The fuel cell stack of claim 16, wherein said frame comprises polycarbonate.

22. The fuel cell stack of claim 16, wherein:
    said anode assembly comprises an anode conductive support having opposing sides;
    an anode gas diffusion layer is formed on one side of the anode conductive support;
    an anode catalyst is formed on the side of the anode conductive support opposite the anode gas diffusion layer; and
    the anode catalyst comprises at least one binder polymer.

23. The fuel cell stack of claim 22, wherein said proton exchange membrane comprises an ionomer.

24. The fuel cell stack of claim 23, wherein said ionomer comprises a sulfonated tetrafluoroethylene.

25. The fuel cell stack of claim 22, wherein said at least one binder polymer comprises an ionomer.

26. The fuel cell stack of claim 25, wherein said at least one binder polymers comprises a sulfonated tetrafluoroethylene.

27. The fuel cell stack of claim 25, wherein said anode catalyst comprises platinum.

28. The fuel cell stack of claim 25, wherein said cathode assembly comprises a cathode catalyst, the cathode catalyst comprising ruthenium.

29. The fuel cell stack of claim 25, wherein said cathode assembly comprises:
    a cathode conductive support having opposing sides;
    a cathode gas diffusion layer formed on one side of said second conductive support; and
    a cathode catalyst formed on the side of the cathode conductive support oppose the cathode gas diffusion layer.

30. The fuel cell stack of claim 16, each fuel cell in said fuel cell stack produces a voltage ranging from about 1.2 to about 1.3 volts.

31. The fuel cell stack of claim 16, further comprising cooling equipment to receive and cool outgoing electrolyte from each output of said plurality of fuel cells and a recirculator to recirculate at least a portion of said outgoing electrolyte back to the inlet of each of said plurality of fuel cells.

32. The fuel cell stack of claim 31, wherein said recirculator comprises an HCl separator, the HCl separator to process said outgoing electrolyte into at least a concentrated HCL fraction and a relatively weak electrolyte fraction, and to recirculate the relatively weak electrolyte fraction back to the inlet of each of said plurality of fuel cells.

* * * * *